UNITED STATES PATENT OFFICE.

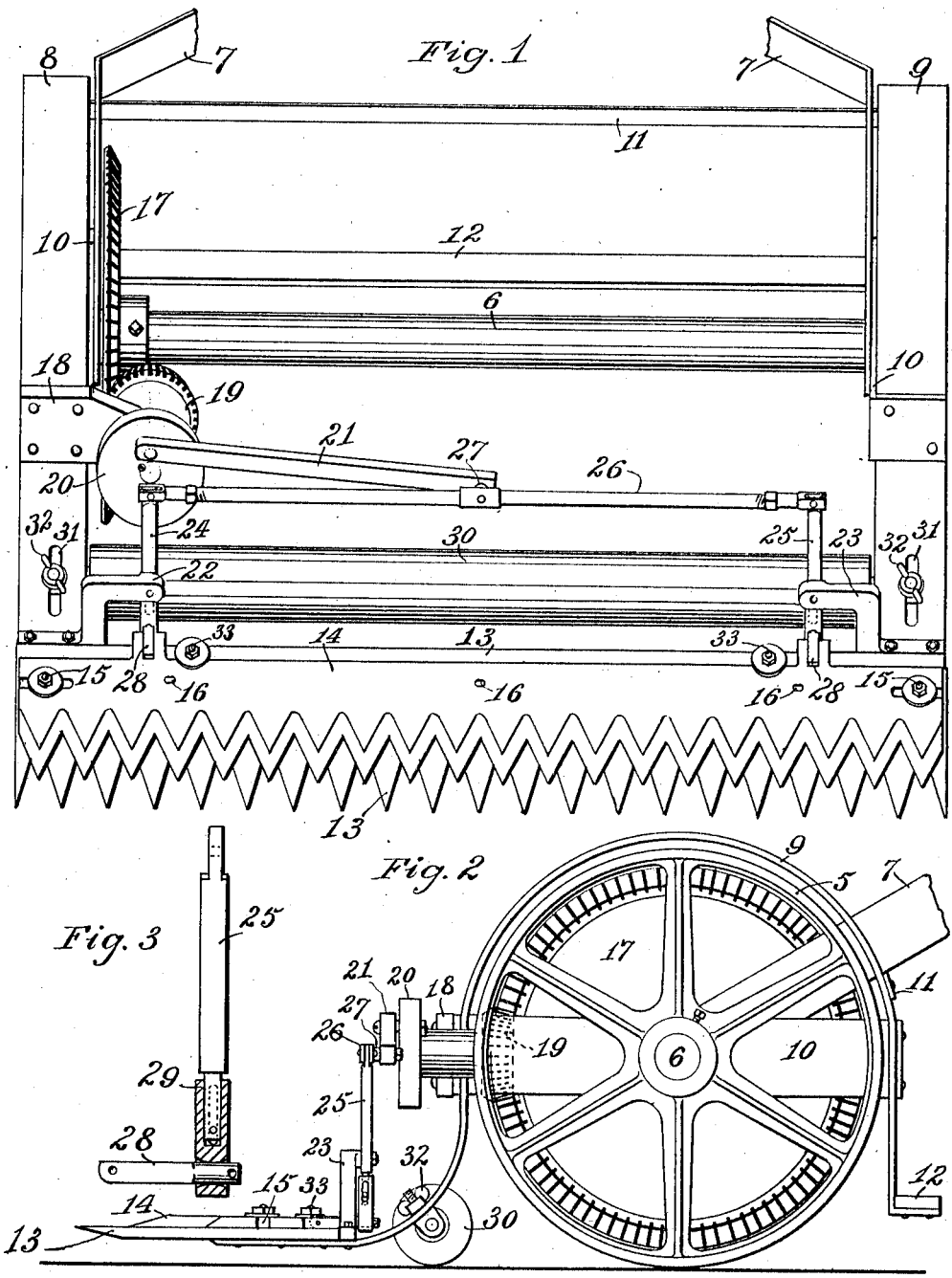

JOHN EDMUNDS, OF SHAMOKIN, PENNSYLVANIA.

LAWN-MOWER.

1,026,204.  Specification of Letters Patent.  Patented May 14, 1912.

Application filed December 22, 1911. Serial No. 667,380.

*To all whom it may concern:*

Be it known that I, JOHN EDMUNDS, a citizen of the United States, residing at Shamokin, in the county of Northumberland and State of Pennsylvania, have invented certain new and useful Improvements in Lawn-Mowers, of which the following is a specification.

This invention relates to lawn-mowers and particularly to that class of lawn-mowers having reciprocating cutters.

The chief object of the invention is to improve upon the manner of forming and mounting the reciprocating cutting mechanism, including the means of transmitting motion to the cutter bar.

To this end the invention consists in the form, construction and combination of parts substantially as hereinafter set forth and claimed.

In the accompanying drawings which form a part of this specification Figure 1 is a front elevation of the improved mower; Fig. 2 is an end elevation thereof, the handle being broken away in both instances; and Fig. 3 is a detail on an enlarged scale.

Referring to the drawings the ground wheels indicated at 5 are connected to the driving shaft 6, and to this shaft, in the usual manner, is connected the handle 7 of the mower. The frame work for supporting the cutting mechanism and the mechanism by which motion is conveyed from the driving shaft to the cutting mechanism, may be variously constructed and mounted, but the form illustrated in the drawings is preferred, wherein the chief elements of the said frame are the wheel guards 8 and 9 which arch over the ground wheels and extend forward thereof in an oblique manner near the ground. These wheel guards are mounted upon the driving shaft by means of horizontal bars 10 through which said shaft passes and which at their ends are riveted or otherwise secured to the bands forming the wheel guards. These wheel guards are also preferably connected at the rear of the wheels by a bar 11 which forms a support for the handle in its lowermost position as well as forming a connection between said guards. A rest, as 12, may also connect the lower rear ends of the wheel guards.

The finger bar 13 is connected to the forward ends of the extensions of the wheel guards. Upon the finger bar 13 is mounted the cutter bar 14 in a manner to provide for its reciprocation. Such mounting is preferably effected by notching the ends of the cutter bar to receive studs, as 15, upon the upper ends of which suitable anti-friction washers may be placed and above these nuts for holding the cutter bar to the finger bar. It may be noted that the fingers and the sections of the cutter bar are longer than usual thereby providing for more rapid and smoother cutting. Suitable oil holes, as indicated at 16, may be provided through the cutter bar to lubricate the meeting faces of the finger bar and cutter bar.

For the reciprocation of the cutter bar, a bevel gear, as 17, is fixed upon the driving shaft 6. Upon the wheel guard 8 is mounted a projection 18 in which is journaled a counter-shaft bearing at one end a bevel-pinion 19 for engagement with the bevel gear 17 and upon the other end of which is mounted a crank, or, as shown in the drawings, a disk 20 bearing a wrist pin for the attachment of a pitman 21 which drives the reciprocating mechanism. Upon the forward extensions of the wheel guards there are mounted supports, as 22 and 23, in the upper ends of which are pivoted levers 24 and 25. These levers are connected at their lower ends to the cutter bar and are joined at their upper ends by the link 26. To this link the pitman 21 is connected by a stud-pivot 27.

The connection of the lower ends of the levers 24 and 25 to the cutter bar may be effected in any suitable manner so long as provision is made for the variation in leverage due to the swinging of said levers in the reciprocation of the cutter bar. For this purpose studs, as 28, may be pivoted in suitable lugs on the rear edge of the cutter bar. In addition to this the lower ends of the levers 24 and 25 may be provided with telescoping joints 29, as illustrated in detail in Fig. 3. Obviously, either of these means for providing for varying leverage may be used alone. The wooden roller 30 for supporting the cutting mechanism has its journal bearings mounted in slots 31 formed in the oblique portions of the wheel guards. Screw-threaded projections on the journal bearings of the roller extend through said slots and have thereon thumb nuts 32 and by means of these the roller may be shifted up or down the oblique portions of the wheel guards and so regulate the distance of the cutting mechanism from the ground.

Suitable antifriction collars and washers may be mounted upon studs 33 fixed in the finger bar at the rear edge of the cutter bar.

The invention claimed is:—

1. In a lawn-mower the combination with the ground-wheels and driving shaft, of wheel guards arched over the ground wheels and supported on said shaft and having extensions in front of said wheels, a finger bar connecting said extensions, a cutter bar mounted for reciprocation upon the finger bar, a roller mounted at its ends for vertical adjustment upon said extensions, and a cutter-bar driving mechanism connected to said cutter bar and geared to said driving shaft.

2. In a lawn-mover, the combination with the ground-wheels and driving shaft, of guards for said wheels, means connected to said guards and supported on said shaft, said guards having extensions in front of said wheels, a finger bar connecting said extensions, a cutter bar mounted for reciprocation upon the finger bar, upright arms on said extensions, upright levers pivoted to said arms and at their lower ends pivoted to the cutter bar, a link connecting the upper ends of said levers, and a pitman connected to said link and geared to said driving shaft.

3. In a lawn-mower, the combination with the ground-wheels and driving shaft, of wheel guards supported on said shaft and having extensions in front of said wheels, a finger bar connecting said extensions, a cutter bar mounted for reciprocation upon the finger bar, upwardly extending arms on said extensions, levers pivoted in said arms and at their lower ends pivoted to the cutter bar, a link connecting the upper ends of said levers, a pitman connected to said link, a counter-shaft mounted in a bearing on one of said wheel guards, and a pair of gear wheels connecting said counter-shaft to said driving shaft.

4. In a lawn-mover, the combination with the ground wheels and driving shaft, of wheel guards arched over said wheels and having forwardly and downwardly inclined extensions in front of the wheels the inclined portions being longitudinally slotted, cutting mechanism supported on the forward ends of said extensions, and a roller having bearings at its ends adjustably supported in the slots of said extensions.

In testimony whereof I affix my signature in presence of two witnesses.

JOHN EDMUNDS.

Witnesses:
PHILIP CONBEER,
WM. B. MAY.